United States Patent
Koeckemann et al.

(10) Patent No.: US 9,261,198 B2
(45) Date of Patent: Feb. 16, 2016

(54) METHOD FOR ACTUATING A HYDRAULIC VALVE ARRANGEMENT, AND HYDRAULIC VALVE ARRANGEMENT

(71) Applicant: Robert Bosch GmbH, Stuttgart (DE)

(72) Inventors: Albert Koeckemann, Lohr (DE); Hermann Mehling, Karlstadt-Stetten (DE)

(73) Assignee: Robert Bosch GmbH, Stuttgart (DE)

( * ) Notice: Subject to any disclaimer, the term of this patent is extended or adjusted under 35 U.S.C. 154(b) by 181 days.

(21) Appl. No.: 13/974,198

(22) Filed: Aug. 23, 2013

(65) Prior Publication Data

US 2014/0060654 A1 Mar. 6, 2014

(30) Foreign Application Priority Data

Aug. 31, 2012 (DE) .................. 10 2012 017 207

(51) Int. Cl.
- *F16K 31/02* (2006.01)
- *F16K 11/00* (2006.01)
- *F15B 13/044* (2006.01)

(52) U.S. Cl.
CPC .............. *F16K 11/00* (2013.01); *F15B 13/044* (2013.01); *F15B 2211/30565* (2013.01); *F15B 2211/3138* (2013.01); *F15B 2211/3144* (2013.01); *F15B 2211/327* (2013.01); *F15B 2211/328* (2013.01); *F15B 2211/6346* (2013.01); *F15B 2211/665* (2013.01); *Y10T 137/0318* (2015.04); *Y10T 137/86493* (2015.04)

(58) Field of Classification Search
CPC ...... F16K 11/00; F15B 13/044; F15B 13/085; F15B 13/0889; F15B 13/0896; F15B 2211/30565; F15B 2211/3144; F15B 2211/327; F15B 2211/382; F15B 2211/4053; F15B 2211/40592; Y10T 137/87265; Y10T 137/0318; Y10T 29/49826; Y10T 29/494; Y10T 29/49428; Y10T 436/2575
USPC ................ 137/486, 487.5, 1, 599.01, 599.05, 137/599.07; 91/361, 363 R, 32, 489
See application file for complete search history.

(56) References Cited

U.S. PATENT DOCUMENTS

| | | | | |
|---|---|---|---|---|
| 3,038,449 | A | * | 6/1962 | Murphy, Jr. et al. ............. 91/31 |
| 4,030,523 | A | * | 6/1977 | Cram et al. ............. 137/599.07 |
| 4,256,100 | A | * | 3/1981 | Levy et al. ............. 128/204.21 |
| 5,044,394 | A | * | 9/1991 | Brombach ............. 137/486 |
| 5,313,871 | A | * | 5/1994 | Kaneko et al. ............. 91/361 |
| 5,329,965 | A | * | 7/1994 | Gordon ............. 137/599.07 |
| 5,599,270 | A | * | 2/1997 | Lorey ............. 494/5 |
| 5,638,926 | A | * | 6/1997 | McCrickard ............. 188/273 |

(Continued)

FOREIGN PATENT DOCUMENTS

EP 2 431 640 A2 3/2013

*Primary Examiner* — Craig Schneider
*Assistant Examiner* — Minh Le
(74) *Attorney, Agent, or Firm* — Maginot, Moore & Beck LLP

(57) ABSTRACT

The disclosure relates to a method for actuating a hydraulic valve arrangement, having a hydraulic continuously adjustable valve and having a hydraulic switching valve for providing a variable opening cross section, wherein an opening cross section threshold value is predefined, wherein, above the opening cross section threshold value, the switching valve is placed into a defined switching position and only the continuously adjustable valve is actuated, and wherein, below the opening cross section threshold value, the continuously adjustable valve is placed into a defined switching position and only the switching valve is actuated.

14 Claims, 1 Drawing Sheet

(56) References Cited

U.S. PATENT DOCUMENTS

| | | | |
|---|---|---|---|
| 5,938,425 A * | 8/1999 | Damrath et al. | 431/62 |
| 7,284,564 B2 * | 10/2007 | Olander | 137/14 |
| 7,513,247 B2 * | 4/2009 | Clauss et al. | 126/39 E |
| 7,669,590 B2 * | 3/2010 | Oberhomburg | 126/214 R |
| 7,677,154 B2 * | 3/2010 | Schmidt | 91/454 |
| 8,365,762 B1 * | 2/2013 | Trotter | 137/487.5 |
| 8,418,714 B2 * | 4/2013 | Ohmi et al. | 137/486 |
| 8,555,920 B2 * | 10/2013 | Hirata et al. | 137/599.07 |
| 2005/0087238 A1 * | 4/2005 | Wilson et al. | 137/599.07 |
| 2008/0115834 A1 * | 5/2008 | Geoffrion et al. | 137/9 |
| 2009/0114284 A1 * | 5/2009 | Siivonen et al. | 137/1 |
| 2012/0286180 A1 * | 11/2012 | Mehling et al. | 251/129.05 |

* cited by examiner

METHOD FOR ACTUATING A HYDRAULIC VALVE ARRANGEMENT, AND HYDRAULIC VALVE ARRANGEMENT

This application claims priority under 35 U.S.C. §119 to patent application no. DE 10 2012 017 207.9, filed on Aug. 31, 2012 in Germany, the disclosure of which is incorporated herein by reference in its entirety.

BACKGROUND

The present disclosure relates to a method for actuating a hydraulic valve arrangement, and to a hydraulic valve arrangement.

In hydraulic systems, use is made of continuously adjustable valves, such as for example proportional valves, whose opening cross section can be adjusted in a substantially continuous fashion (for example by the application of an analog actuation signal). Continuously adjustable valves are used for example in order to control or regulate the position, the speed and/or the fluid pressure of hydraulic pistons. Continuously adjustable valves however have the disadvantage that very small opening cross sections can be set accurately only with great effort, because the relationship between actuation signal and opening cross section is highly non-linear in said range. For example, the precise setting of small and/or slow piston movements is therefore relatively complex.

It is therefore desirable to specify a facility for being able to set both large and also small opening cross sections in as precise a manner as possible by means of one valve arrangement.

SUMMARY

According to disclosure, there is proposed a method for actuating a valve arrangement, and a valve arrangement, having the features described herein.

The following description further discloses advantageous refinements.

The disclosure is based on the realization that a valve arrangement having a continuously adjustable valve and a switching valve can be used in a particularly advantageous manner for controlling or regulating position, speed and/or fluid pressure if the advantages of both valves are combined such that an opening cross section can be set in a highly precise manner over the entire possible range of, in particular, 0% to 100%. Here, it is substantially the case that the continuously adjustable valve is used for large opening cross sections above a threshold value (of for example more than 10%) and the switching valve is used for small opening cross sections up to the threshold value. At the same time, the respective other valve is placed into a functionless state, that is to say is closed in the case of a parallel connection and is open in the case of a series connection. It is thus possible for the disadvantages that exist with a continuously adjustable valve in the case of small opening diameters to be overcome through the use of a switching valve for said range. A particularly suitable continuously adjustable valve is a proportional directional control valve, and a particularly suitable switching valve is a directional seat valve. If the valve arrangement is supplied with a constant hydraulic pressure, it is also possible for consideration to be given to the volume flow rate instead of the opening cross section.

The disclosed method offers particular advantages in manufacturing machines. Here, to optimize cycle times, such machines normally operate with a rapid-traverse/creep speed profile, that is to say the machining position is approached as quickly as possible (that is to say with a large opening cross section: high dynamics, high speed—for example 1 m/s) and then the machining process itself (for example pressing, drilling etc.) is carried out with high precision (that is to say small opening cross section: low dynamics, low speed—for example 10 μm/s). For this field of use, large volume flow rates must be handled for the fast movements, and very low volume flow rates must be regulated for the precision, the solution according to the disclosure being particularly suitable for this.

The switching valve is preferably operated in ballistic fashion, as described for example in EP 2 431 640 A2. In this way, it is possible for a small opening cross section or a small volume flow rate to be set with very high precision.

The valve arrangement expediently has an actuation circuit which, as a function of an input signal (for example for predefining an opening cross section from 0% to 100%), generates output signals suitable as actuation signals for the valves that are used, that is to say in particular an analog signal for the continuously adjustable valve, and a digital signal, for example a PWM signal, for the switching valve. The actuation circuit may generate the output signals from the input signal for example by means of a stored relationship, for example characteristic curves.

If such a valve arrangement is used for regulating a position, a speed or a fluid pressure, simple proportional regulation (P regulator) is sufficient. PI regulation with an integral component, such as is required in the prior art for low values, can be dispensed with. This simplifies the regulation considerably.

As a result of the combination of an inexpensive and simple continuously adjustable valve with a switching valve that is actuated in ballistic fashion, the advantages of the two technologies are combined and the disadvantages are reduced, that is to say a high level of precision is attained even in the low-signal range, a variable speed adjustment is attained without disturbing noise generation (such as normally arises in the case of switching valves in the high-signal range), and simple and stable regulation is attained.

The continuously adjustable valve and the switching valve are particularly preferably connected in parallel, because then the switching valve need only be configured for low through-flow rates, as it is closed in the case of high throughflow rates. The switching valve can thus be designed to be small and of low mass, which permits fast switching processes. The parallel connection offers a wider field of use and greater flexibility in particular with regard to throughflow increase (speed increase, operation of large cylinders) with conventional components (6-port, 10-port and 16-port valves, direct and pilot-controlled). A series connection is likewise possible, but here, increased outlay in terms of hydraulics (block, piping) would be required because all of the ports (pressure source and pump, working line ports and ventilation port or tank) would have to be blocked, for example by means of 2/2 directional seat valves.

Since, in the case of slide valves, the leakage is normally highly dependent on the temperature (that is to say high levels of leakage in the warm state and low levels of leakage in the cold state), the use of a slide valve with a relatively large positive overlap (of for example at least 20%) as a continuously adjustable valve is expedient.

The switchover point between the continuously adjustable valve and the switching valve, that is to say the opening cross section threshold value or volume flow rate threshold value, is predefined as a function of the application. Here, consideration should expediently be given to the size or a dead volume of the assembly to which a supply is provided by the valve arrangement (for example a hydraulic motor, hydraulic cylinder etc.), whether the assembly itself has pipe or hose connections, and/or whether the valve arrangement is connected to the assembly directly or via hoses.

A processing unit according to the disclosure, for example a control unit of a valve arrangement, is set up, in particular in terms of programming technology, to execute a method according to the disclosure.

Further advantages and refinements of the disclosed method and arrangement will emerge from the description and from the appended drawings.

It is self-evident that the features mentioned above and the features yet to be explained below may be used not only in the respectively specified combination but rather also in other combinations or individually without departing from the scope of the present disclosure.

BRIEF DESCRIPTION OF THE DRAWINGS

The disclosure is schematically illustrated in the drawing on the basis of exemplary embodiments, and will be described in detail below with reference to the drawings.

DETAILED DESCRIPTION

Figure 1:
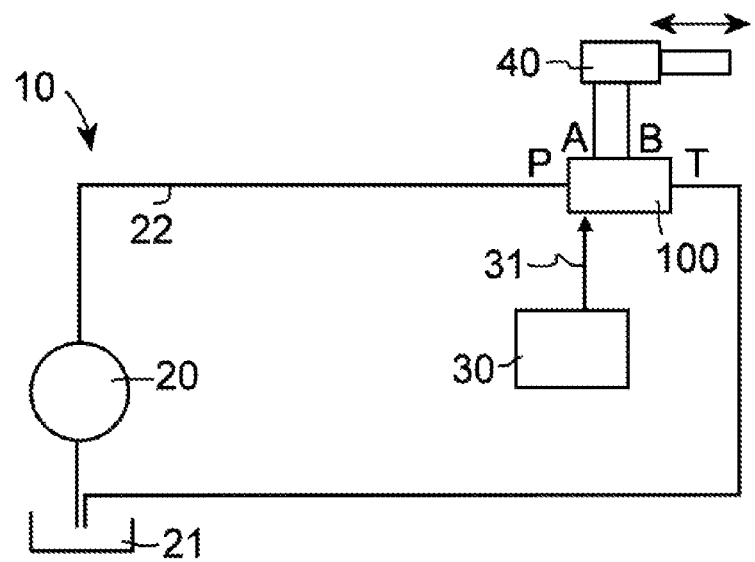
FIG. 1 schematically shows a preferred embodiment of a hydraulic machine according to the disclosure.

FIG. 1 schematically illustrates a hydraulic machine 10 which has a preferred embodiment of a valve arrangement 100 according to the disclosure. The hydraulic machine 10 has a pressure source 20, for example a hydraulic pump, which delivers hydraulic fluid from a tank 21 and discharges said hydraulic fluid into a hydraulic line 22. The hydraulic line 22 is connected to a pressure source port P of the valve arrangement 100. As is conventional, the valve arrangement 100 also has a tank port T and working line ports A and B.

The hydraulic machine 10 also has a control unit or a processing unit 30 which actuates the valve arrangement 100 preferably by means of electrical actuation signals 31. As a result of the actuation, the working line ports A, B are connected correspondingly to the ports P and T, such that a hydraulic assembly 40, for example a hydraulic cylinder, can be correspondingly charged with hydraulic fluid in order to control the movement and/or speed thereof.

Figure 2:
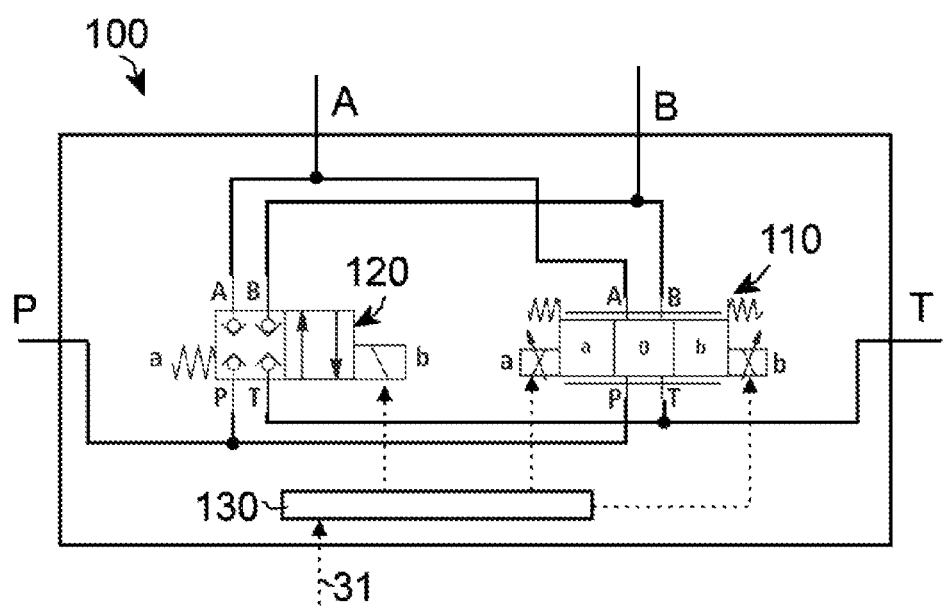
FIG. 2 schematically shows a preferred embodiment of a valve arrangement according to disclosure.

FIG. 2 shows the valve arrangement 100 in more detail. In a preferred embodiment, the valve arrangement 100 has a continuously adjustable valve 110 and a switching valve 120 which, as per the embodiment illustrated here, are connected in parallel. This means that the supply ports P and T and the working line ports A and B are in each case connected in parallel. The valve arrangement 100 also has a processing unit 130 which receives the actuation signals 31 supplied thereto and converts these into suitable actuation signals for the valves 110 and 120.

The actuation signal 31 may in particular be an analog voltage signal which is a setpoint value for a volume flow rate Q from A to B or vice versa. If the valve arrangement is supplied with a constant hydraulic pressure, the setting of a volume flow rate corresponds to the setting of the opening cross section. The actuation signal may in particular be an analog voltage signal, for example from −10 V to +10 V. Accordingly, the volume flow rate Q may be from −100% (that is to say full volume flow rate from B to A) to +100% (that is to say full volume flow rate from A to B).

The continuously adjustable valve is characterized in that it has a variable opening cross section as a function of an analog or continuous actuation signal (that is to say "0, . . . , 1"), which is applied in this case to a and b. The switching valve is characterized in that it closes fully or opens fully as a function of a digital or discreet actuation signal (that is to say "0" or "1"), which in this case is applied to a terminal b. In the case of a ballistic actuation, a digital actuation signal is applied with a high sample rate, such that "0" is already present again before the valve has fully opened, and such that "1" is already present again before the valve has fully closed. Thus an intermediate state is set with an opening cross section which is likewise variable (by means of the sample rate). A ballistic actuation method that can advantageously be used within the context of the disclosure is described in the already-cited EP 2 431 640 A2, the disclosure of which is incorporated herein by reference in its entirety.

In the preferred embodiment, a volume flow rate threshold value $Q_0$ is predefined, wherein a volume flow rate $Q<Q_0$ is provided by the switching valve 120 and a volume flow rate $Q>Q_0$ is provided by the continuously adjustable valve 110. Accordingly, in the case of a volume flow rate $Q<Q_0$, the processing unit 130 actuates the switching valve 120, preferably in ballistic fashion, and closes the continuously adjustable valve 110, and in the case of a volume flow rate $Q>Q_0$, the processing unit 130 actuates the continuously adjustable valve 110 and closes the switching valve 120.

Instead of a switching valve which is actuated in ballistic fashion, the use of a switching valve bridge circuit is also possible. A predetermined volume flow rate can be provided also through the actuation, preferably PWM actuation, of a switching valve bridge circuit of said type.

The disclosure makes it possible to predefine any desired volume flow rate over a wide range and, in so doing, to permit large volume flow rates and also to set small volume flow rates with a high level of precision. In this way, hydraulic cylinders 40, or hydraulic machines in general, can be operated in a particularly advantageous manner.

What is claimed is:

1. A method for actuating a hydraulic valve arrangement configured to provide a variable opening cross section having a continuously adjustable valve and a switching valve, the method comprising:
   coupling a pressure source of hydraulic fluid to the hydraulic valve arrangement;
   closing the continuously adjustable valve and actuating only the switching valve when the variable opening cross section is less than an opening cross section threshold value; and
   closing the switching valve and actuating only the continuously adjustable valve when the variable opening cross section is greater than the opening cross section threshold value.

2. The method according to claim 1, further comprising:
   actuating the switching valve in ballistic fashion when the opening cross section is less than the opening cross section threshold value.

3. The method according to claim 1, wherein:
   the continuously adjustable valve is in the form of a continuously adjustable valve with positive overlap, and
   the opening cross section threshold value is predefined as a function of a degree of positive overlap.

4. The method according to claim 1, wherein a variable volume flow rate is provided and a volume flow rate threshold value is predefined.

5. A processing unit which configured to execute a method according to claim 1.

6. A hydraulic valve arrangement configured to provide a variable opening cross section, comprising:
   a continuously adjustable valve;
   a switching valve;
   a source of hydraulic fluid coupled to the hydraulic valve arrangement; and
   a processing unit according configured to (i) place the switching valve into a first closed position and actuate only the continuously adjustable valve when the variable opening cross section is greater than an opening cross section threshold value, and (ii) place the continuously adjustable valve into a second closed position and actuate only the switching valve when the variable opening cross section is less than the opening cross section threshold value.

7. The hydraulic valve arrangement according to claim 6, wherein the continuously adjustable valve and the switching valve are connected in parallel.

8. The hydraulic valve arrangement according to claim 6, wherein the processing unit is configured to generate a first actuation signal for the continuously adjustable valve and a second actuation signal for the switching valve from an arrangement actuation signal for the hydraulic valve arrangement.

9. The hydraulic valve arrangement according to claim 8, wherein the arrangement actuation signal for the hydraulic valve arrangement is one of an analog current value and a voltage value which predefines one of a setpoint opening cross section and a setpoint volume flow rate.

10. The hydraulic valve arrangement according to claim 8, wherein the first actuation signal for the continuously adjustable valve is one of an analog current value and a voltage value which predefines one of a setpoint opening cross section and a setpoint volume flow rate.

11. The hydraulic valve arrangement according to claim 8, wherein the second actuation signal for the switching valve is one of a digital current value and a voltage value which predefines a switching state.

12. A hydraulic machine comprising:
   a pressure source for hydraulic fluid;
   a hydraulic valve arrangement according to claim 6; and
   a hydraulic assembly configured such that charging of the hydraulic assembly with hydraulic fluid is controlled by the valve arrangement.

13. A computer program having program code means configured to prompt a processing unit to execute a method according to claim 1 when said program code means are executed on the processing unit.

14. A computing device used in a hydraulic valve arrangement having a continuously adjustable valve and a switching valve configured to provide a variable opening cross section, comprising:
   a processing unit; and
   a machine-readable memory medium having stored thereon a computer program configured to prompt the processing unit to (i) operate the switching valve into a first closed position and actuate only the continuously adjustable valve when the variable opening cross section is greater than an opening cross section threshold value, and (ii) operate the continuously adjustable valve into a second closed position and actuate only the switching valve when the variable opening cross section is less than the opening cross section threshold value.

\* \* \* \* \*